United States Patent [19]

Francis

[11] Patent Number: 4,899,416

[45] Date of Patent: Feb. 13, 1990

[54] WIND POWERED CLEANING AND POLISHING FLAP FOR BOAT RAILS

[76] Inventor: Charles Francis, 5127 Neptune Sq., Oxnard, Calif. 93035

[21] Appl. No.: 299,791

[22] Filed: Jan. 23, 1989

[51] Int. Cl.[4] ........................... B08B 1/00; B60S 1/00; A47L 25/00

[52] U.S. Cl. ........................... 15/104.93; 15/210 B; 15/246; 15/256.6; 114/221 R

[58] Field of Search ................. 15/104.93, 210 B, 246, 15/256.6; 114/221 R

[56] References Cited

U.S. PATENT DOCUMENTS

| | | | |
|---|---|---|---|
| 1,219,051 | 3/1917 | Tallaksen | 15/256.6 |
| 2,394,855 | 2/1946 | Gould | 15/104.93 |
| 2,604,650 | 7/1952 | Mottelson | 15/210 B |
| 2,979,753 | 4/1961 | Gunston | 15/256.6 |

*Primary Examiner*—Harvey C. Hornsby
*Assistant Examiner*—M. Spisich

[57] ABSTRACT

This handrail polishing flap is designed to depend from boat handrails when the boat is not in use, so as to clean and polish the handrails by wind power only. Primarily, it consists of a panel with a bristled plastic strip in the longitudinal middle portion that contains a cleaning and polishing agent that engages with the handrail. Mating hook and loop pile fasteners are secured to the flap for holding it together on the handrail, and pockets are provided in the end portion that depends downward from the handrail, for returning the flap to its full downward position after each movement back and forth caused by the wind.

4 Claims, 1 Drawing Sheet

FIG. 1
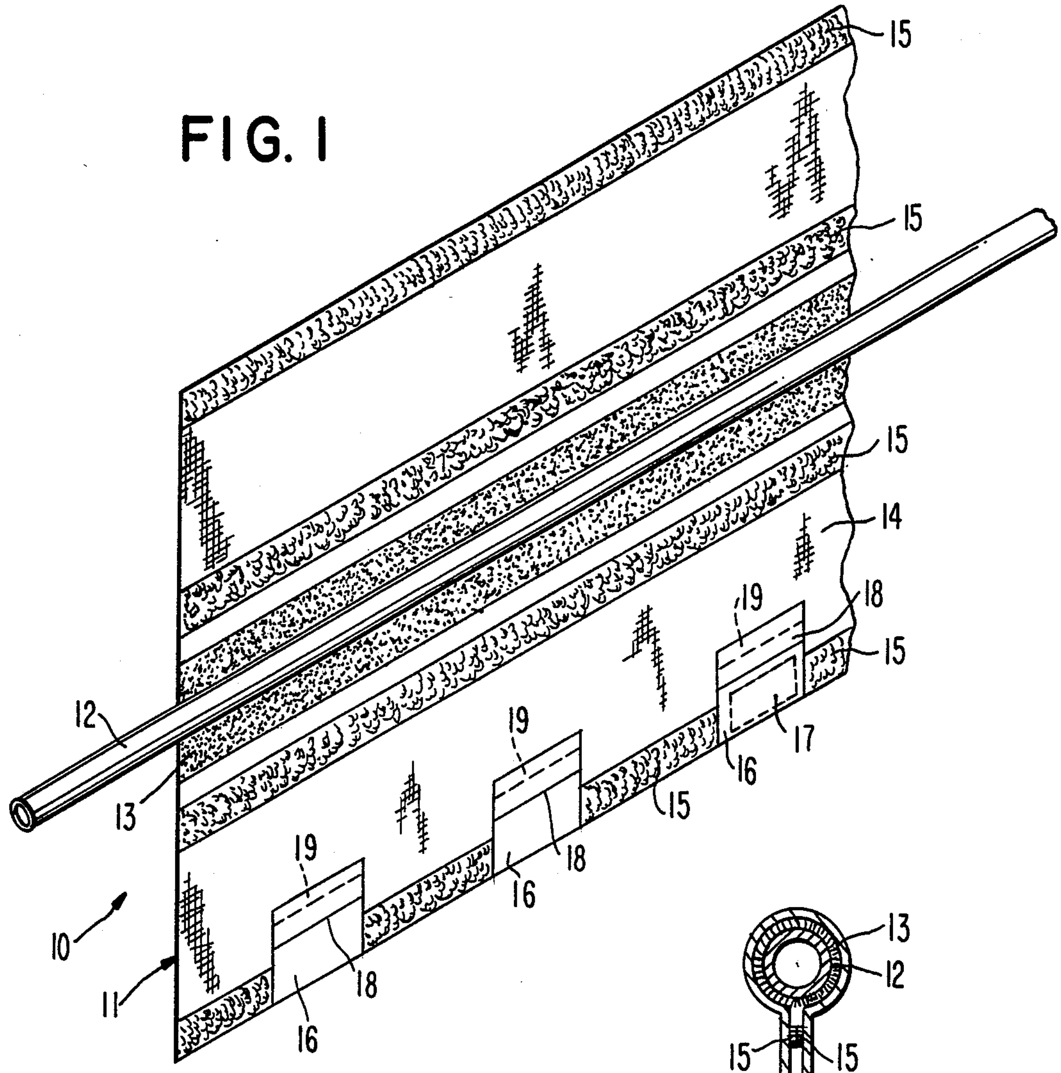
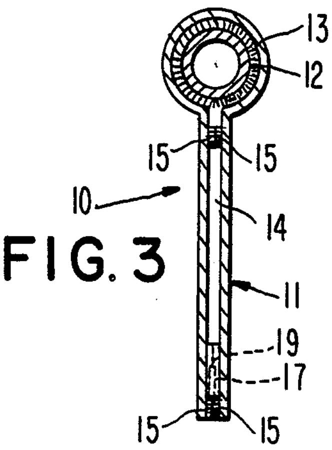
FIG. 3
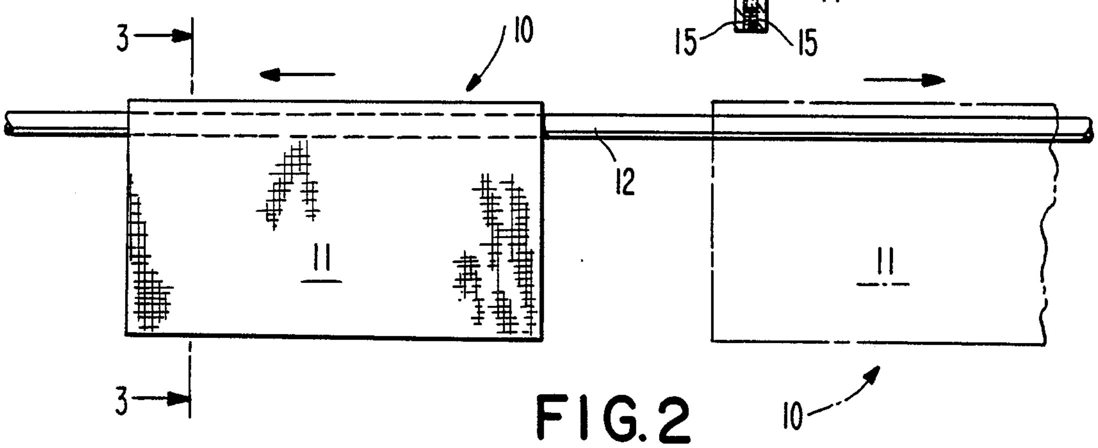
FIG. 2

WIND POWERED CLEANING AND POLISHING FLAP FOR BOAT RAILS

BACKGROUND AND FIELD OF THE INVENTION

This invention relates to cleaning and polishing flap devices, and more particularly, to a wind powered cleaning and polishing flap for boat rails.

DESCRIPTION OF PRIOR ART

Cleaning and polishing devices are known in the art, and references and the U.S. Pat. Nos. 4,375,115 of Zimmerman, No. 3,527,611 of Newfarmer, No. 2,960,706 of Dunham, and 1,134,881 of Lockwood. While these units may be suitable for the particular purpose to which they address, they would not be as suitable for the purpose of the present invention, as hereinafter will be described.

The principal object of this invention is to provide a wind powered cleaning and polishing flap for boat rails, that will be of such design, as to effectively clean and polish boat rails of any type of material, even wood, without any manual labor being involved in doing so.

Most handrails on boats are one half to one inch in diameter and are very difficult to keep shined and clean, particularly under salt air conditions, and the present invention is so designed, as to be adaptable to fit any size boat rail.

Another object of this invention is to provide a wind powered cleaning and polishing flap for boat rails that will be in the form of a flexible panel that will move back and forth in the wind and will put a self-contained polishing agent to work for the cleaning and polishing thereof.

Keeping boat rails clean while the boat sits in a slip or parking spot is a never ending task, because they constantly deteriorate even during mild weather, and adverse weather conditions just cause the process to accelerate.

A further object of this invention is to provide a wind powered cleaning and polishing flap for boat rails that will be simple in design, inexpensive to manufacture, and will be long lasting.

SUMMARY OF THE INVENTION

This wind powered cleaning and polishing flap for boat rails comprises a panel that includes a cleaning and polishing strip for engagement with a handrail and depends downward for the wind to move it back and forth. The flap is held in place on the handrail by mating hook and loop pile fasteners, which also enable the flap to be easily removed from the handrail when desired.

BRIEF DESCRIPTION OF FIGURES

FIG. 1 is a diagrammatic perspective view of the present invention, shown prior to being fastened to a handrail;

FIG. 2 is a diagrammatic horizontal elevational view of the handrail showing the invention fastened thereto, and another one of the flaps is shown fragmentary and in phantom, and FIG. 3 is a cross-sectional view taken along the line 3—3 of FIG. 2.

DETAILED DESCRIPTION

Accordingly, a flap 10 is shown to include a flexible plastic panel 11 that is designed to drape over a boat handrail 12 and depend therefrom, for back and forth movement by the force of the wind. A bristled plastic strip 13 is provided for retaining a suitable polishing agent (not shown) for cleaning and polishing handrail 12, and strip 13 is fixedly secured to surface 14 at the center longitudinal area thereof.

A pair of mating hook and loop pile fasteners 15 are spaced from the side of bristled plastic strip 13 and provide for securing panel 11 together in the handrail 12 receiving area, and plastic pockets 16 are equally spaced apart and fixedly secured to surface 14 at one longitudinal side edge portion and removably receive a lead weight 17 that serves to keep flap 10 depending downward from the handrail 12.

The covers 18 and th faces of pockets 16, are also provided with mating hook and loop pile fasteners 19 for sealing in the lead weights 17 and further mating hook and loop pile fasteners 15 are fixedly secured to the surface 14 at longitudinal side portions to hold the longitudinal side portions together.

In use, flaps 10 are employed in plurality on handrails 12. To install, the bristled plastic strip 13 containing a cleaning and polishing agent is engaged with the handrail 12 and the adjacent fasteners 15 are pressed together. After the above, the outer longitudinal side fasteners 15 are pressed together, and th lead weights 17 will cause the flap 10 to depend downward.

When the wind is blowing it will cause the flap 10 to pivot back and forth on the handrail 12, and thus clean and polish the handrail 12.

When it is desired to remove flap 10 from the handrail 12, it is grasped and peeled apart, the same being effected with the weight 17 containing pockets 16.

While various changes may be made in the detailed construction, such changes will be within the spirit and scope of the present invention, as defined by the appended claims.

What is claimed is:

1. A wind powered cleaning and polishing flap for boat handrails. comprising, a panel that drapes over a boat handrail, a bristled plastic strip secured to an inside surface said panel, providing for engagement with an outer periphery of said handrail and retaining a cleaning and polishing agent, mating hook and loop pile fasteners secured to said panel for retaining said draped panel on said handrail, and pockets secured to said panel, for removably receiving lead weights that provide a means for said panel to depend downwards from said handrail after each movement caused by wind force reacting on the surface of said draped panel.

2. A wind powered cleaning and polishing flap for boat handrails as set forth in claim 1, wherein said bristled plastic strip is fixedly secured to a longitudinal center of a surface of said panel, and a pair of said mating hook and loop pile fasteners are parallel spaced from edges of said bristled plastic strip and held said bristled plastic strip in engagement with said handrail.

3. A wind powered cleaning and polishing flap for boat handrails as set forth in claim 2, wherein said pockets are at least three and are equally spaced apart and fixedly secured to said surface adjacent to one longitudinal edge of said panel, and each pocket of said pockets receives a lead weight and said pocket is provided with a cover having fastening means that closes said cover to a face of said pocket.

4. A wind powered cleaning and polishing flap for boat handrails as set forth in claim 3, wherein other mating hook and loop pile fasteners are also fixedly secured to said surface at longitudinal sides and fasten said longitudinal sides together.

* * * * *